United States Patent [19]

Usui et al.

[11] Patent Number: 4,581,891
[45] Date of Patent: Apr. 15, 1986

[54] EXHAUST EMISSION CONTROL DEVICE FOR DIESEL ENGINE

[75] Inventors: Toshifumi Usui, Katsuta; Shouzo Yanagisawa, Ibaraki; Kazumi Iwai, Mito, all of Japan

[73] Assignee: Hitachi, Ltd., Japan

[21] Appl. No.: 583,868

[22] Filed: Feb. 27, 1984

[30] Foreign Application Priority Data

Feb. 25, 1983 [JP] Japan .................. 58-31660

[51] Int. Cl.⁴ ........................................ F01N 3/10
[52] U.S. Cl. ........................................ 60/286; 60/284; 60/303; 60/311
[58] Field of Search .............. 60/274, 286, 303, 296, 60/311, 284

[56] References Cited

U.S. PATENT DOCUMENTS

| | | | |
|---|---|---|---|
| 2,946,651 | 7/1960 | Houdry | 60/296 |
| 3,751,914 | 8/1973 | Pollock | 60/284 |
| 4,211,075 | 7/1980 | Ludecke | 60/311 |
| 4,281,512 | 8/1981 | Mills | 55/283 |
| 4,419,113 | 12/1983 | Smith | 55/DIG. 10 |

Primary Examiner—Douglas Hart
Attorney, Agent, or Firm—Antonelli, Terry & Wands

[57] ABSTRACT

An exhaust emission control device for a diesel engine which controls the burner for oxidizing particulates in an exhaust gas of the diesel engine trapped in a filter by a burner being ignited after a predetermined time from a starting of the diesel engine.

6 Claims, 3 Drawing Figures

EXHAUST EMISSION CONTROL DEVICE FOR DIESEL ENGINE

BACKGROUND OF THE INVENTION

The present invention relates to an exhaust emission control device and, more particularly, to an exhaust emission control device for a diesel engine wherein particulates in an exhaust gas from the diesel engine are oxidized by a burner over a predetermined time period.

A number of system for reducing particulates in the exhaust gas by an exhaust emission control device for desiel engines have been proposed including mechanical particulate trapping systems and an electrostatic precipitation system, with such systems generally collecting particulates in a trap and oxidizing the trapped particulates.

In, for example, Japanese Utility Model Laid-Open Application No. 57-136814 (1982), an arrangement is proposed wherein, for the purposes of determining a regeneration timing of a filter trapping particulates from an exhaust gas of a diesel engine, exhaust pressures are continuously prestored in a memory so that the oxidation of the particulates starts during an idling of the engine as soon as a measured exhaust pressure reaches a predetermined stored limit value.

A disadvantage of the above proposed arrangement resides in the fact that it is highly probable that the engine may be turned off during the oxidation so that the exhaust gas flow and the oxidizing air flow are stopped when the exhaust pipe is still at a relatively high temperature. By virtue of the existence of the relative high temperature, the filter is subjected to breakage, the exhaust pipe or exhaust system may be damaged, and the overall effects of the exhaust emission control device may be affected.

The aim underlying the present invention essentially resides in providing an exhaust emission control device for a diesel engine which minimizes if not avoids the possibility of a filter breakdown, damage to an exhaust system of the engine, and which considerably enhances or improves the overall performance of the exhaust emission control.

In accordance with advantageous features of the present invention, the oxidation of the filter can be started after a predetermined time period has elapsed after a starting of the engine, whereby the filter is effectively oxidized within a time period when the temperature of the filter becomes nearly equal to that of the exhaust gas of the diesel engine.

Advantageously, in accordance with the present invention, an exhaust emission control device for a diesel engine is provided which includes a filter for collecting particulates in an exhaust gas from a diesel engine, a burner for oxidizing the particulates, and a control arrangement for igniting the burner after a predetermined time from a start of the engine cranking.

The control means of the present invention may, in accordance with the present invention, be adapted to ignite the burner after a predetermined time period from a subsequent starting of the engine cranking when a pressure loss within the filter reaches a predetermined value. The predetermined value may, for example, be equal to or less than ten minutes.

Advantageously, in accordance with further features of the present invention, the predetermined time period may be determined in dependence upon an exhaust temperature of the diesel engine.

Additionally, according to the present invention, the control means may also ignite the burner after a pressure loss within the filter reaches the predetermined value prior to an expiration of the predetermined time period.

Accordingly, it is an object of the present invention to provide an exhaust emission control device for a diesel engine which avoids, by simple means, shortcomings and disadvantages encountered in the prior art.

Another object of the present invention resides in providing an exhaust emission control device for a diesel engine which functions realiably under all operating conditions of the diesel engine.

Yet another object of the present invention resides in providing an exhaust emission control device for a diesel engine which is simple in construction and therefore relatively inexpensive to manufacture.

These and other objects, features, and advantages of the present invention will become more apparent from the following description when taken in connection with the accompanying drawings, which show, for the purposes of illustration only, one embodiment in accordance with the present invention.

DETAILED DESCRIPTION

Figure 1:
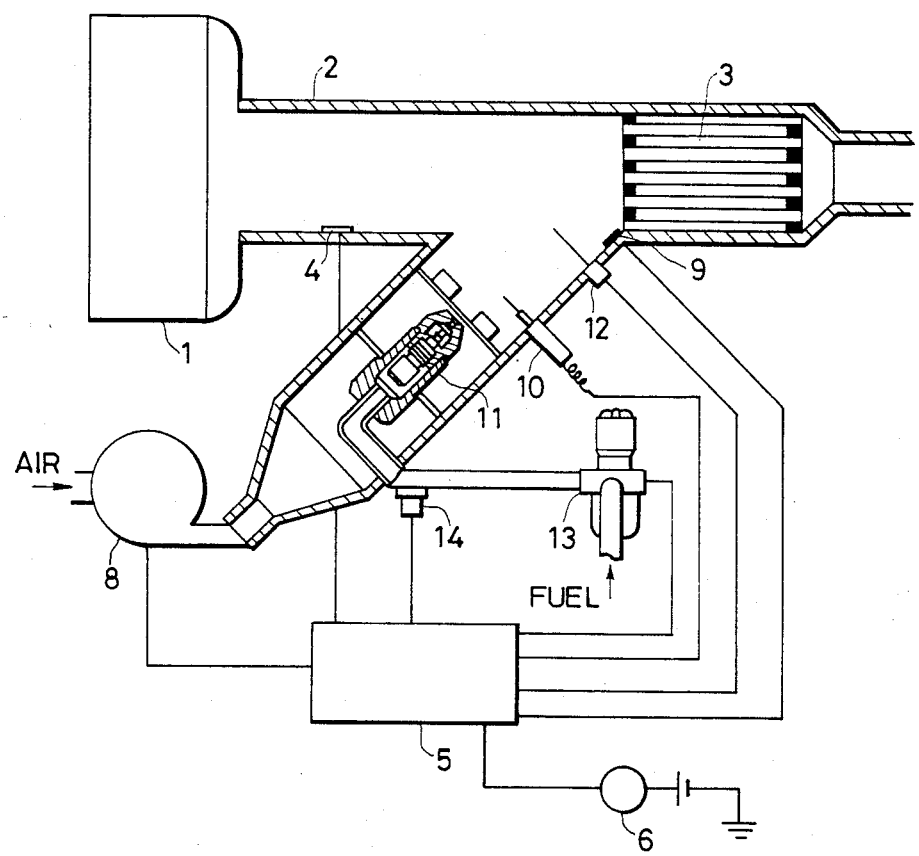
FIG. 1 is a partially schematic cross sectional view of an e embodiment of an exhaust emission control device with a control means constructed in accordance with the present invention.

Referring now to the drawings and, more particularly, to FIG. 1, according to this figure, exhaust from a diesel engine passes through an exhaust pipe 2 having disposed therein a particulate filter 3, an exhaust pressure sensor 4, and an exhaust gas temperature sensor 9. A burner 11 is arranged so as to communicate with the exhaust passage 2, with an air pump 8 being adapted to supply cooling air for a casing or housing surrounding the burner 11. An ignition means such as, for example, a spark plug 10, is disposed in proximity to the burner 11, and a flame sensor is disposed upstream of the burner 11. A fuel pump 13 is provided for supplying fuel to the burner 11, with a solenoid valve means 14 controlling the supply of fuel oil to the burner 11. A microcomputer 5 is adapted to receive output signals from the pressure sensor 4, temperature sensor 9, and flame sensor 12, and to process the output signals and provide an appropriate output signal to the solenoid valve means 14 and the spark plug 10.

After a key or ignition switch 6 is switched ON, exhaust gas emitted from the diesel engine passes through the exhaust pipe 2 and filter 3 and the particulates, black smoke, within the exhaust gas are trapped by the filter 3. However, because of the trapped black smoke, the pressure loss within the filter 3 rises so much that driveability and mileage are considerably reduced.

Figure 2A:
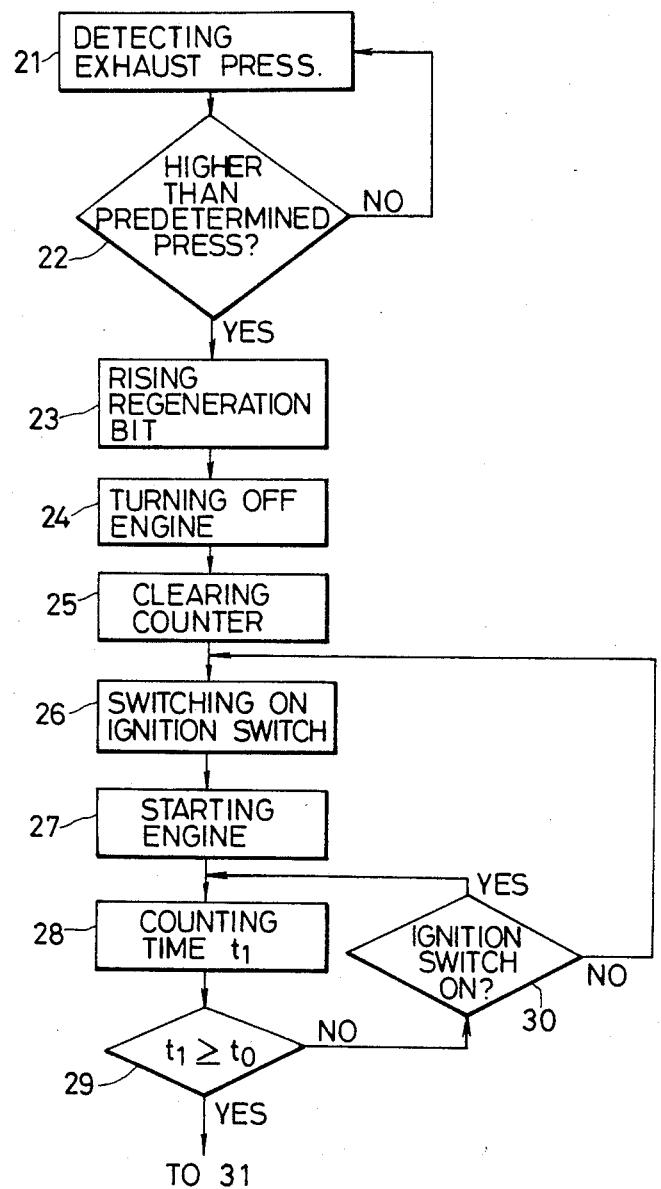
FIGS. 2A and 2B are flow charts for an exhaust emission control device constructed in accordance with the present invention.

As shown in FIG. 2A, as soon as the pressure sensor 4 detects at step 21 that the exhaust pressure in the exhaust pipe 2 has become higher than a predetermined value at step 22, this fact is stored in a microcomputer 5 at step 23. When the switch 6 is turned OFF at step 24, a first timer (not shown) in the microcomputer is reset at step 25. At the same time, the information that a predetermined value of the exhaust pressure has been exceeded is not clear but is left so that the first timer starts to count at step 28 simultaneously with a turning ON of the switch 6 at step 26 and the starting of the engine at step 27.

Figure 2B:
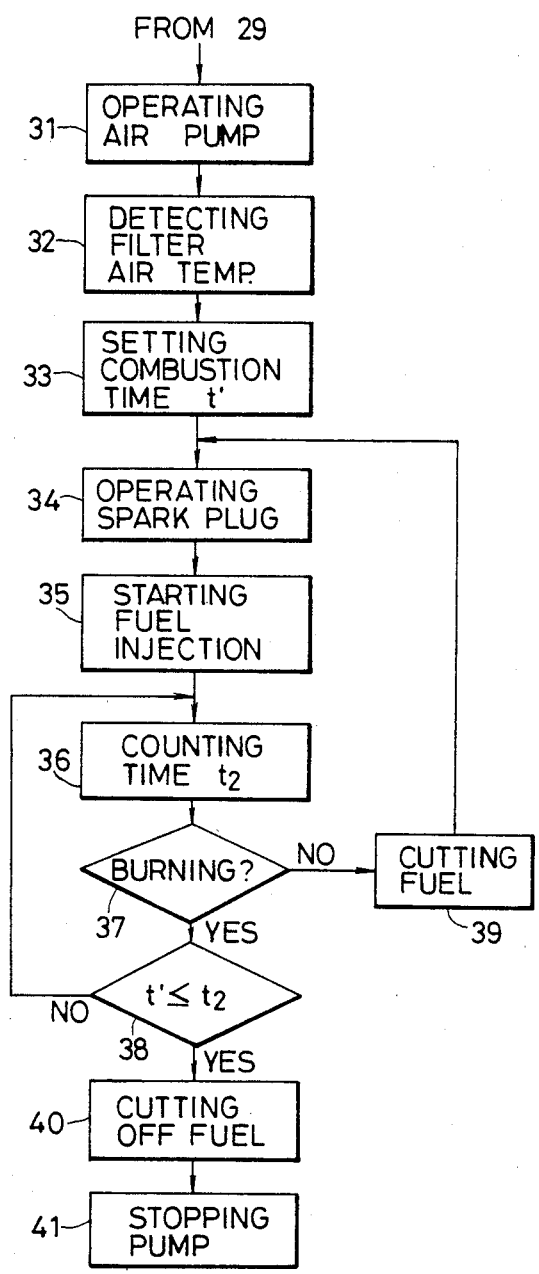

When the count $t_1$ of the first timer reaches one minute or a predetermined value $t_0$ at step 29, as shown in FIG. 2B, the air pump 8 starts to operate at step 31, the spark plug 10 starts to spark at step 34 and the current temperature of the filter 3 is measured by a temperature sensor 9 at step 32 so that the time $t'$ during which the burner 11 must burn to provide oxidation of the particulates can be determined at step 33. The fuel is ignited by the spark plug 10 at step 34 and the solenoid valve 14 is opened at step 35 so as to enable the burner 11 to be supplied with fuel oil at step 35. At the same time, a second timer (not shown) in the microcomputer 5 starts counting the operating or combustion time period $t_2$ of the burner 11. The ignition is confirmed by the flame sensor 12 at step 37. When the combustion is continued for a necessary time period $t_2$, wherein $t' \leq t_2$ at step 38, the fuel from the fuel pump is cut off at step 40 by the solenoid valve 14 so that the flame is extinguished and the fuel pump 13 is stopped at step 41.

Generally, when a vehicle is used, the engine 1 is very seldom stopped immediately after it has been started. According to experiments, filter regeneration or filter deoxidation by a burner 11 takes at most approximately five minutes. Therefore, it a predetermined time period $t_0$ is set at one minute, the regeneration is completed within six minutes after a start of the engine 1. The possibility that the engine 1 is turned off during that period is much smaller than when a regeneration of the filter 3 is randomly started. Consequently, the frequency with which the burner 11 and other parts are exposed to heat radiated from the hot filter 3, and the cooling air from the pump 8 is stopped, is so reduced that the realiability of the exhaust emission control device is considerably improved.

According to the present invention, the predetermined time period $t_0$ need not be set longer than approximately ten minutes because the results of market research have determined that the time between the start of cranking of an engine to when it is turned off is very seldom less than 15 minutes.

Since a regeneration or deoxidation of the filter 3 is difficult when the exhaust temperature is extremely low, the predetermined combustion or operating time $t_0$ is extended at step 33 when the exhaust temperature, as sensed by the exhaust gas temperature sensor 9 is low.

It is also possible, if the filter pressure loss exceeds a predetermined value within the predetermined time $t_0$, for an immediate starting of a regeneration of the filter 3 without waiting for the next time the engine is started.

The regeneration of the filter 3 can also be started after travelling a predetermined distance following a starting of the vehicle such as would occur, for example, in a forwarding or delivery truck which remains for long periods of time parked with the engine running, but which will travel long distances once the vehicle begins to move.

In all of the cases described hereinabove, a regeneration of the filter 3 is conducted within a predetermined time period after the engine is cranked so that the filter 3 and associated peripheral devices need not be heated to a temperature higher than necessary and so that the possiblility of a state in which the filter is being regenerated while the engine is turned off can be minimized. Considering that when the temperature of the filter 3 exceeds a regenerative temperature the filter may regenerate itself when the vehicle is running at high speed while heavily loaded. Moreover, it is logical to conduct regeneration of the filter 3 before the temperature of the filter 3 gets too high because the filter is seldom heated to a temperature higher than a certain level within ten minutes after a starting of the engine.

While we have shown and described only one embodiment in accordance with the present invention, it is understood that the same is not limited thereto but is susceptible of numerous changes and modifications as known to one having ordinary skill in the art and we therefore do not wish to be limited to the details shown and described herein, but intend to cover all such modifications as are encompassed by the scope of the appended claims.

We claim:

1. An exhaust emission control device for a diesel engine, the control device comprising a filter means for collecting particulates in exhaust gas from the diesel engine and the exhaust gas passes through an exhaust passage means, a burner means communicating with said exhaust means for oxidizing said particulates, control means for controlling an ignition of said burner means after a predetermined time period from a starting of the diesel engine, and means for sensing a pressure in the exhaust passage means and for providing an output signal to said control means whereby said control means is adapted to control an ignition of said burner means after a predetermined time period from a subsequent starting of the engine when a pressure loss within said filter means reaches a predetermined value.

2. An exhaust emission control device for a diesel engine according to claim 1, wherein said predetermined time period is equal to or less than ten minutes.

3. An exhaust emission control device for a diesel engine according to claim 1, wherein means are provided for sensing an exhaust gas temperature and for providing an output signal to said control means whereby said control means controls said predetermined time period in dependence upon the exhaust temperature of the exhaust gas of the engine.

4. An exhaust emission control device for a diesel engine according to claim 1, wherein said control means is adapted to ignite said burner means after said pressure in the exhaust passage means reaches a predetermined value prior to an expiration of said predetermined time period.

5. An exhaust emission control device for a diesel engine according to claim 4, wherein said predetermined time period is equal to or less than ten minutes.

6. An exhaust emission control device for a diesel engine, the control device comprising a filter means for collecting particulates in exhaust gas from the diesel engine as the exhaust gas passes through an exhaust passage means, a burner means communicating with said exhaust passage for oxidizing said particulates, control means for controlling an ignition of said burner means after a predetermined time period for a starting of the diesel engine, and means for sensing an exhaust gas temperature and for producing an output signal to said control means whereby said control means controls said predetermined time period in dependence upon the exhaust temperature of the engine.

* * * * *